United States Patent Office 2,844,636
Patented July 22, 1958

2,844,636

PREPARATION OF FLUORINE COMPOUNDS

Robert Neville Haszeldine, Cambridge, England, and Hyman Iserson, Philadelphia, Pa., assignors to Pennsalt Chemicals Corporation, Philadelphia, Pa., a corporation of Pennsylvania No Drawing. Application May 24, 1956
Serial No. 586,900

Claims priority, application Great Britain July 1, 1955

9 Claims. (Cl. 260—653)

This invention is concerned with the preparation of 1,1,2,3,4,4-hexafluorobutane, chlorinated and brominated homologues of 1,1,2,3,4,4-hexafluorobutane and perfluorobutadiene, and is concerned in particular with methods whereby these compounds can be made easily and economically from perfluorocyclobutene.

The increasing use of organic fluorine compounds in many industrial applications, as for example in lubricants, elastomers, and solvents, has given rise to the need for new methods of preparing such compounds.

Among the fluorocompounds which have been found useful and desirable to manufacture are 1,1,2,3,4,4-hexafluorobutane, its chlorine and bromine substituted homologues 1,2,3,4-tetrachloro- and tetrabromohexafluorobutane, and the dichloro- and dibromohexafluorobutanes, and perfluorobutadiene. The former compounds are valuable as solvents and as chemical intermediates. Perfluorobutadiene has been polymerized to yield oils, greases and heat exchange fluids, having a great chemical stability. Rubbery materials have also been made which have the advantage of being highly resistant to many chemically reactive substances. Such polymers are described, for example, in W. T. Miller's United States Patent No. 2,668,182 and in Bulletin MDDC-432 of the United States Atomic Energy Commission entitled "The Preparation and Reactions of Perfluorobutadiene-1,3" by W. T. Miller. See also Prober and Miller, "The Thermal Polymerization of Hexafluorobutadiene," Journal of the American Chemical Society, vol. 71, page 598, February 1949; and Report R2–52–195 of the M. W. Kellog Co. to Quartermaster Corps, United States Army, dated May 1, 1952.

Processes which up to the present have been suggested for manufacturing these materials have in general had the drawback that they consume expensive materials such as mercury and iodine and are not well fitted for use on an industrial scale.

It has now been found that 1,1,2,3,4,4-hexafluorobutane can conveniently be made by reacting perfluorocyclobutene with hydrogen, using elemental iodine as the catalyst. Perfluorobutadiene is then made from 1,1,2,3,4,4-hexafluorobutane by indirectly dehydrogenating the latter.

As examples of ways in which perfluorobutadiene can be made by indirect dehydrogenation of 1,1,2,3,4,4-hexafluorobutane, the latter compound can be converted by conventional chlorination or bromination to 1,2,3,4-tetrachlorohexafluorobutane, or the corresponding tetrabromo compound or the dichloro- or dibromohexafluorobutanes, which four compounds by dechlorinating, debrominating, dehydrochlorinating, and dehydrobrominating respectively, can then be converted to perfluorobutadiene.

These reactions may be written as follows:

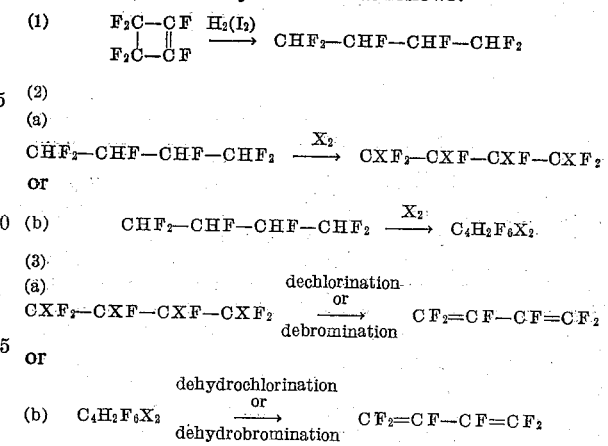

(2)
(a)
$$CHF_2-CHF-CHF-CHF_2 \xrightarrow{X_2} CXF_2-CXF-CXF-CXF_2$$
or (b) $CHF_2-CHF-CHF-CHF_2 \xrightarrow{X_2} C_4H_2F_6X_2$ (3)
(a)
$$CXF_2-CXF-CXF-CXF_2 \xrightarrow[\text{debromination}]{\text{dechlorination or}} CF_2=CF-CF=CF_2$$
or (b) $C_4H_2F_6X_2 \xrightarrow[\text{dehydrobromination}]{\text{dehydrochlorination or}} CF_2=CF-CF=CF_2$ where X is Cl or Br.

It will be noted that the initial hydrogenation reaction is unusual in that not only is there hydrogen addition at the double bond, but cleavage and hydrogenation at the —CF$_2$—CF$_2$— single bond to give the substituted normal butane.

The starting material for the present reactions, perfluorocyclobutene, is readily prepared from trifluorochloroethylene by heating the latter substance at about 200° C. to form 1,2,dichloro-1,2,3,3,4,4-hexafluorocyclobutane,

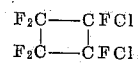

which may then be dechlorinated to perfluorocyclobutene.

In preparing 1,1,2,3,4,4-hexafluorobutane from perfluorocyclobutene, the latter compound is introduced into a pressure vessel with iodine and hydrogen. A molar excess of hydrogen is used, usually of the order of about twice the stoichiometric amount.

Iodine is present in a purely catalytic capacity and it has been found that although there is no hydrogenation in the absence of iodine, even traces of iodine will catalyze the reaction to a certain degree. As a practical matter, however, it is preferred to use between about 0.1 and about 1.5 mols of iodine (I$_2$) per mole of perfluorocyclobutene.

The reaction is preferably carried out at a temperature between about 250° C. and about 400° C., usually around 300° C. It has been found that uneven heating leads to undesirable side reactions. This may be avoided by the use of a salt or oil bath, for example.

The pressure is not considered critical and will be whatever is created in the vessel during the reactions. Pressures ranging from about 250 to about 2500 pounds per square inch gauge have been found suitable. The reaction is carried through until it is complete or as close to complete as practicable, at the temperature and pressure being used. Generally the reaction time is of the order of 4 to 25 hours, usually about 8 hours.

When the reaction is complete, the compound (CHF$_2$CHF)$_2$ is removed from the pressured vessel.

Preparation of perfluorobutadiene is carried out by indirect dehydrogenation of CHF$_2$—CHF—CHF—CHF$_2$ in any convenient manner. Preferably, however, $$CHF_2-CHF-CHF-CHF_2$$

is chlorinated or brominated to form

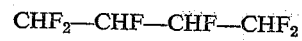
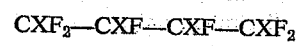

where X is Cl or Br and the latter compound dechlorinated or debrominated to form the desired perfluorobutadiene.

Chlorination of CHF$_2$—CHF—CHF—CHF$_2$ to form (CXF$_2$CXF)$_2$ is readily accomplished in a conventional manner, as for example by reaction with elemental chlorine in the presence of water under ultra-violet light. In place of ultra-violet light, any other agency which will lead to free radical formation from chlorine or from $$CHF_2—CHF—CHF—CHF_2$$

may be used, such for example as heat, visible light, as X or gamma radiation or high energy electron radiation. In the chlorination step, the CHF$_2$—CHF—CHF—CHF$_2$ is put into any convenient reaction vessel (a silica or Pyrex tube if ultra-violet radiation is to be employed), with at least about four times the stoichiometric amount of chlorine. Enough water is also preferably added to absorb the hydrogen chloride produced. If ultra-violet light is used, the vessel is then irradiated at room temperature, or slightly above, for example at about 30° C. The pressure may be subatmospheric but is preferably super-atmospheric, a pressure of, for example, about 150 pounds per square inch gauge being suitable.

The photochemical reaction is not rapid and will take several hours or even days to complete. Thermal chlorination may also be used, e. g. reaction with chlorine in the dark at 100 to 400° C. in a flow apparatus.

The chlorinated brominated butane is next dechlorinated or debrominated by any convenient means, as for example by the use of zinc dust, iron, magnesium or sodium amalgam. Of these, zinc is preferred. The amount of zinc used is at least that necessary to take up all the chlorine or bromine present, with preferably an excess of say 10–20%.

The dechlorination or debromination reaction is preferably carried out in the presence of a solvent for the organic compounds involved. The particular solvent used is not critical. Examples of suitable solvents are alcohols, such as methanol, ethanol, butanol, tetrahydro pyran and tetrahydro furan, glycols such as ethylene glycol, ethers, and substituted amides.

The reaction is preferably carried out by refluxing the reactants with the solvent. The temperature of the reaction is therefore normally the reflux temperature of the particular solvent used. The reaction can, however, be carried out at room temperature. Pressure is not critical and may be atmospheric. Reaction time is again not critical. It is usually of the order of ½ to 10 hours.

As pointed out above, other methods of dehydrogenating the 1,1,2,3,4,4-hexafluorobutane to form perfluorobutadiene may be used than forming $$CF_2Cl—CFCl—CFCl—CF_2Cl$$

or $$CF_2Br—CFBr—CFBr—CF_2Br$$

and dechlorinating or debrominating. For example, 1,1,2,3,4,4-hexafluorobutane may be chlorinated or brominated to give a dichloro or dibromo dihydrohexafluorobutane which may then be dehydrochlorinated or dehydrobrominated with alcoholic NaOH or KOH by known procedures (see, for example, the copending application of Robert N. Haszeldine S. N. 377,716, filed August 31, 1953) to form the desired perfluorobutadiene. In forming the dichloro or dibromo compounds, the techniques described above in connection with the formation of the tetrachloro compound may be employed, except that elevated pressure is not necessary, and in general a shorter reaction time may be used.

The invention will be further described with reference to the following specific examples which are presented for the purpose of illustration only.

HYDROGENATION OF PERFLUOROCYCLOBUTENE

Example I

Two grams of iodine were placed in a 300 ml. Monel autoclave. The autoclave was then closed, evacuated, and placed in a Dry Ice-acetone trap. Ten grams of perfluorocyclobutene were distilled into the autoclave under vacuum and the autoclave was then charged with hydrogen to a pressure of 280 p. s. i. g. The autoclave was placed in a shaking apparatus and heated at 250 to 300° C. for 21.5 hours. It was then cooled in a Dry Ice-acetone bath and vented to liquid nitrogen-cooled traps. Less than 1 g. of unchanged perfluorocyclobutene liquid was present in the traps. The head was removed from the autoclave and the liquid which was present was removed and distilled. The main fraction was identified as 1,2,3,4-tetrahydrohexafluorobutane.

Example II

A 1-liter stainless steel autoclave was loaded with 20 g. of iodine, and 60 g. perfluorocyclobutene under vacuum. It was pressured to 200 p. s. i. g. with hydrogen and placed in a salt bath at 270–300° C. for 24 hours. It was then opened and the liquid contents were washed with cold water, dried and distilled. 13.5 g. of 1,2,3,4-tetrahydrohexafluorobutane were obtained together with unchanged perfluorocyclobutene.

Example III

An autoclave was charged with 20 g. iodine and 18 g. perfluorocyclobutene as in Example II and pressured with hydrogen to 200 p. s. i. g. at 25° C. It was then heated for 8 hours at 300° C. The crude liquid contents weighed 9 g. After washing with water, there was obtained 7.5 g. of a product having a boiling point of 60–70° C., spectroscopically identified as 1,2,3,4-tetrahydrohexafluorobutane.

Example IV

Twenty grams iodine from a previous run, and 64 g. of perfluorocyclobutene were charged into a 300 ml. autoclave under vacuum. The autoclave was pressured to 225 p. s. i. g. at 41° C. and then heated in an oil bath at 290–305° C. for 19 hours. There was obtained unchanged perfluorocyclobutene and 9 g. of 1,2,3,4-tetrahydrohexafluorobutane.

Example V

The autoclave from Example IV which still contained the iodine from that run was charged with 61 g. of perfluorocyclobutene. It was then placed in a salt bath which had been preheated to 340° C. The temperature leveled out at 300° C. and the pressure in the autoclave was 192 p. s. i. g. It was then pressured to 300 p. s. i. g. with hydrogen. It was kept in the salt bath for 15 hours while the temperature was raised slowly from 300 to 365° C., and for 9 hours more while the temperature was dropped from 365 to 290° C. The autoclave was vented to a water-cooled trap which was in series with a Dry Ice-acetone trap. An oil layer which formed in the water-cooled trap was dried and distilled to give 30 g. of 1,2,3,4-tetrahydrohexafluorobutane. The contents of the Dry Ice trap weighed 31 g. and were unchanged perfluorocyclobutene.

Example VI

A 300 ml. stainless steel autoclave was charged with 0.2 g. PtO$_2$·H$_2$O, 34 g. of perfluorocyclobutene and pressured to 500 p. s. i. g. with hydrogen at 25° C. It was heated at 355° C. for 3 hours, cooled, and vented. No material was found which was liquid at room temperature. Fifteen grams iodine were placed in the autoclave and it was reloaded with the unchanged perfluorocyclobutene from the first part of this reaction. It was then pressured to 500 p. s. i. g. with hydrogen at 25° C. and reheated for four hours at 355° C. It was then cooled, vented, and opened. Twenty-two grams of 1,2,3,4-tetrahydrohexafluorobutane were obtained.

Example VII

A 100 ml. stainless steel autoclave was charged with 10 g. iodine, and 15 g. hexafluorocyclobutene were introduced under vacuum. It was pressured to 440 p. s. i. g. with $H_2$ and placed in an oil bath which had been heated to 290° C. It was then heated for 24 hours at 290–300° C. The autoclave was cooled and vented so that the exit gas passed through traps cooled in liquid oxygen. The more volatile material was unchanged hexafluorocyclobutene (5%), identified by infra-red analysis. The remainder of the product was pumped out of the autoclave and distilled=B. P. 63–65° C. Its infra-red spectrum was identical with that of the spectrum of $$CF_2H—CFH—CFH—CF_2H$$

The yield was 90%.

PREPARATION OF 1,2,3,4-TETRACHLOROHEXAFLUOROBUTANE AND PERFLUOROBUTADIENE

Example VIII

Three grams $CF_2HCFHCFHCF_2H$ made as in Example I were distilled under vacuum into a Vycor tube which contained 2 ml. $H_2O$ and an excess (ca. 5 g.) chlorine. The tube was sealed and irradiated with a Hanovia S–100 watt lamp for 85 hours with the lamp placed close to the tube. The tube was then cooled and opened, and the contents were washed with 5 ml. of 10% caustic soda and dried. Distillation of the dried product yielded a few drops at 120–131° C. The remainder was distilled at 131–132° C. There was no still residue. A sample of this material gave an infra-red spectrum which was identical with that given by a known sample of $$CF_2ClCFClCFClCF_2Cl$$

The tetrachlorohexafluorobutane was then converted to hexafluorobutadiene in high yield by treatment with zinc in ethyl alcohol.

Example IX

Four ml. $H_2O$ and 15 g. chlorine were placed in a silica tube, and 8.3 g. tetrahydrohexafluorobutane were distilled in under vacuum. The tube was sealed and placed horizontally before a Hanovia S–100 watt lamp. The yellow color disappeared after 12 hours. After exposure for 12 hours longer, the lower part of the tube was cooled with liquid nitrogen and the tube was opened. The contents were washed with water, dilute aqueous caustic soda, water and dried over $P_2O_5$. On distillation, there was obtained 0.3 g. B. P. 85–130° C. and 13.7 g. B. P. 130–134° C. An infra-red spectrum of the major fraction was identical with a spectrum of a known sample of 1,2,3,4-tetrachlorohexafluorobutane.

Example X

Twenty-one grams of 1,1,2,3,4,4-hexafluorobutane, made as in Example I, were placed in a Vycor test tube fitted with solid $CO_2$-acetone reflux condenser. The lower end of the test tube was irradiated with a Hanovia S–4 100 watt ultra-violet lamp placed one inch from the tube, just above the liquid level in the tube. A stream of chlorine was passed in over a period of twenty-three hours to maintain a distinct yellow color in the liquid which was slowly refluxed by means of a steam bath. The product was washed with a 5% $Na_2CO_3$ solution, dried over $CaCl_2$ and the 24 g. liquid obtained was fractionally distilled. The main fraction boiling at 102–106° C. was the dichlorodihydroperfluorobutane.

What is claimed is:
1. A method for the manufacture of 1,1,2,3,4,4-hexafluorobutane, which comprises reacting perfluorocyclobutene with hydrogen in the presence of elemental iodine.
2. The method claimed in claim 1 wherein between about 0.1 and about 1.5 mols of iodine are used per mol of perfluorocyclobutene.
3. The method claimed in claim 1 wherein the reaction is conducted at between about 250° C. and about 400° C.
4. A method for the manufacture of a compound selected from the group consisting of 1,2,3,4-tetrachlorohexafluorobutane, 1,2,3,4-tetrabromohexafluorobutane, dichlorohexafluorobutanes, and dibromohexafluorobutanes, which comprises reacting perfluorocyclobutene with hydrogen in the presence of elemental iodine to give 1,1,2,3,4,4-hexafluorobutane and reacting the last named compound with a halogen selected from the group consisting of chlorine and bromine.
5. A method for the manufacture of perfluorobutadiene which comprises reacting perfluorocyclobutene with hydrogen in the presence of elemental iodine to give 1,1,2,3,4,4-hexafluorobutane, halogenating the compound last referred to, to give a compound selected from the group consisting of 1,2,3,4-tetrachlorohexafluorobutane, 1,2,3,4-tetrabromohexafluorobutane, dichlorohexafluorobutanes, and dibromohexafluorobutanes, and converting the last named compound to perfluorobutadiene.
6. A method for the manufacture of perfluorobutadiene, which comprises reacting perfluorocyclobutene with hydrogen and elemental iodine to form 1,1,2,3,4,4-hexafluorobutane, chlorinating the last named compound to form 1,2,3,4-tetrachlorohexafluorobutane and dechlorinating the last named compound.
7. A method for the manufacture of perfluorobutadiene, which comprises reacting perfluorocyclobutene with hydrogen and elemental iodine to form 1,1,2,3,4,4-hexafluorobutane, reacting the last named compound with bromine to form 1,2,3,4-tetrabromohexafluorobutane and debrominating the last named compound.
8. A method for the manufacture of perfluorobutadiene, which comprises reacting perfluorocyclobutene with hydrogen and elemental iodine to give 1,1,2,3,4,4-hexafluorobutane, reacting the last named compound with chlorine to form a dichlorohexafluorobutane, and dehydrochlorinating the last named compound.
9. A method for the manufacture of perfluorobutadiene, which comprises reacting perfluorocyclobutene with hydrogen and elemental iodine to give 1,1,2,3,4,4-hexafluorobutane, reacting the last named compound with bromine to give dibromohexafluorobutane and dehydrobrominating the last named compound.

References Cited in the file of this patent

UNITED STATES PATENTS

| | | |
|---|---|---|
| 2,550,953 | Barrick | May 1, 1951 |
| 2,668,182 | Miller | Feb. 2, 1954 |
| 2,670,388 | Miller et al. | Feb. 23, 1954 |
| 2,671,799 | Miller | Mar. 9, 1954 |

OTHER REFERENCES

Berkman et al.: "Catalysis" (New York: Reinhold Publishing Corp., 1940), page 174 only needed.

Petroleum Refiner, volume 26, No. 3 (1947), pages 122–124, page 123 only needed, abstracted in Chem. Abstracts, volume 42 (1948), page 9148b.

Noller: "Textbook of Organic Chemistry" (Phila., W. B. Saunders Co., 1951), page 507.

UNITED STATES PATENT OFFICE
CERTIFICATE OF CORRECTION

Patent No. 2,844,636                July 22, 1958

Robert Neville Haszeldine et al.

It is hereby certified that error appears in the printed specification of the above numbered patent requiring correction and that the said Letters Patent should read as corrected below.

Column 3, line 29, for "chlorinated brominated" read -- chlorinated or brominated --; column 6, lines 64 and 65, list of references cited, under "OTHER REFERENCES", for "pages 122-124, page 123 only needed" read -- pages 144-46, page 145 only needed --.

Signed and sealed this 3rd day of March 1959.

(SEAL)
Attest:

KARL H. AXLINE ttesting Officer

ROBERT C. WATSON
Commissioner of Patents